United States Patent

[11] 3,618,993

| [72] | Inventor | Eugene L. Platte |
| | | 305 South Harvard, Robinson, Ill. 62454 |
| [21] | Appl. No. | 44,258 |
| [22] | Filed | June 8, 1970 |
| [45] | Patented | Nov. 9, 1971 |
| | | Continuation-in-part of application Ser. No. 3800, Jan. 19, 1970. |

[54] CLIP ASSEMBLY
25 Claims, 17 Drawing Figs.

[52] U.S. Cl. .................................................. 287/20.924,
 287/20.92 C, 287/20.92 D, 287/99, 52/285
[51] Int. Cl. ........................................................ F16b 5/06
[50] Field of Search .......................................... 287/20.924,
 20.925, 20.926, 20.927, 189.35, 20.92 C, 20.92 D,
 20.92 R, 189.35, 92, 99, 101; 52/578, 582, 285;
 211/177

[56] References Cited
UNITED STATES PATENTS

| 835,992 | 11/1906 | Truax | 287/99 X |
| 2,591,373 | 4/1952 | Petruch | 287/99 X |
| 986,841 | 3/1911 | Mayfield | 292/281 |
| 1,792,397 | 2/1931 | Robinson | 292/285 |
| 1,837,997 | 12/1931 | Robinson | 292/281 X |
| 2,728,595 | 12/1955 | Wong | 287/189.35 X |
| 2,820,995 | 1/1958 | Schleuter | 287/20.92 C |
| 2,963,132 | 12/1960 | Rosenbaum | 287/189.35 X |
| 3,113,358 | 12/1963 | Zell et al | 287/20.92 D X |
| 3,490,797 | 1/1970 | Platte | 287/20.924 |

FOREIGN PATENTS

| 857,075 | 12/1960 | Great Britain | 287/20.92 D |

*Primary Examiner*—David J. Williamowsky
*Assistant Examiner*—Wayne L. Shedd
*Attorney*—Holman & Stern ABSTRACT: A clip assembly including male and female clip elements having clip means including cooperating locking means. After securement of the male and female clip elements to structural members to be joined, the structural members may be locked to each other by engagement of the male and female clip means. According to one embodiment, yoke means may be provided to permit disengagement of the male and female clip elements without the need for additional tools. A small round clip assembly is also disclosed for use in close areas. Teeth may be used to preclude rotation of the clip elements if a single-securing means is used to attach a clip element to a supporting member. A further feature includes a plurality of spaced locking means to permit locking of the clip elements even if they are not fully engaged. A further feature provides a clip element used for attaching structural members in an angular relationship which is collapsible for compactness in shipping of the clip element prior to use.

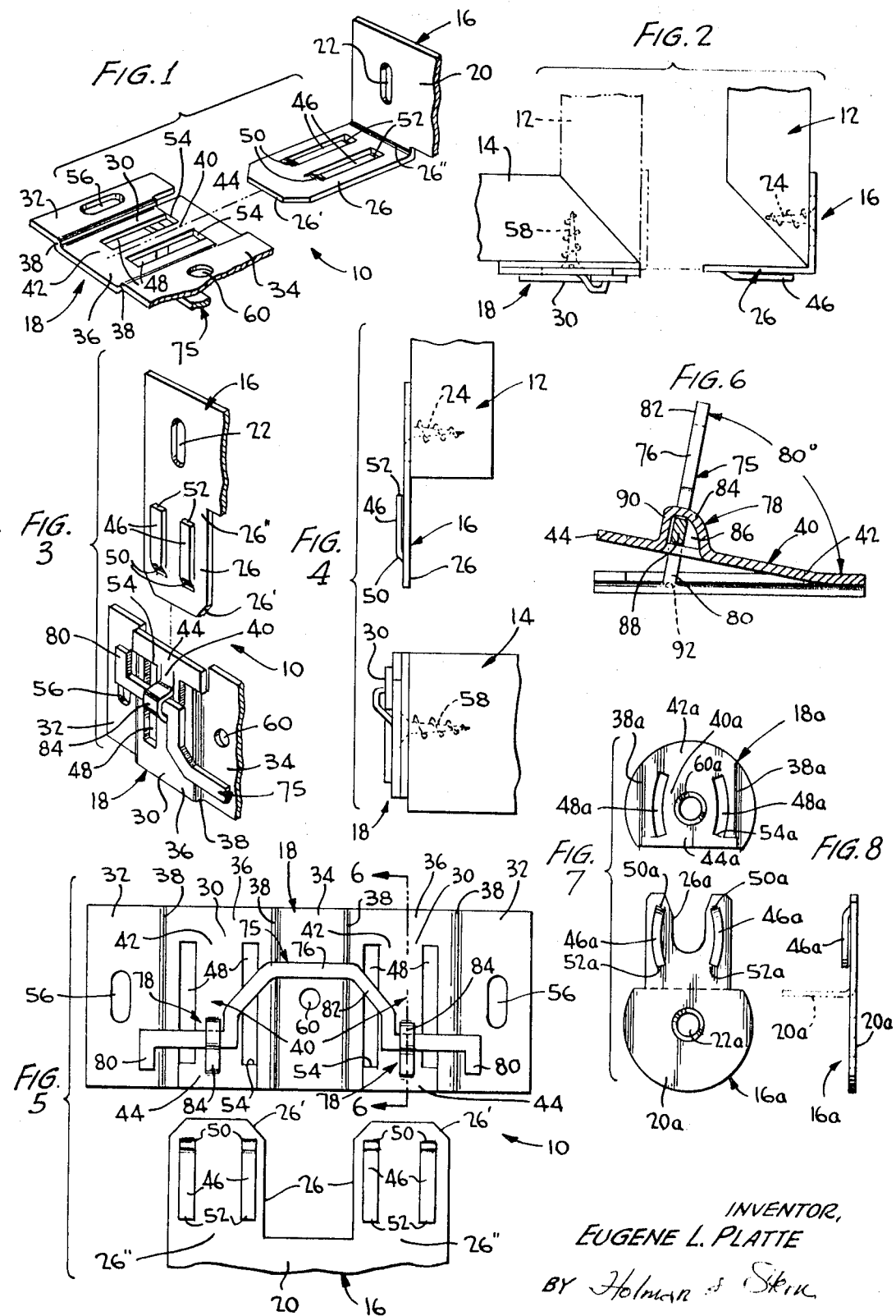

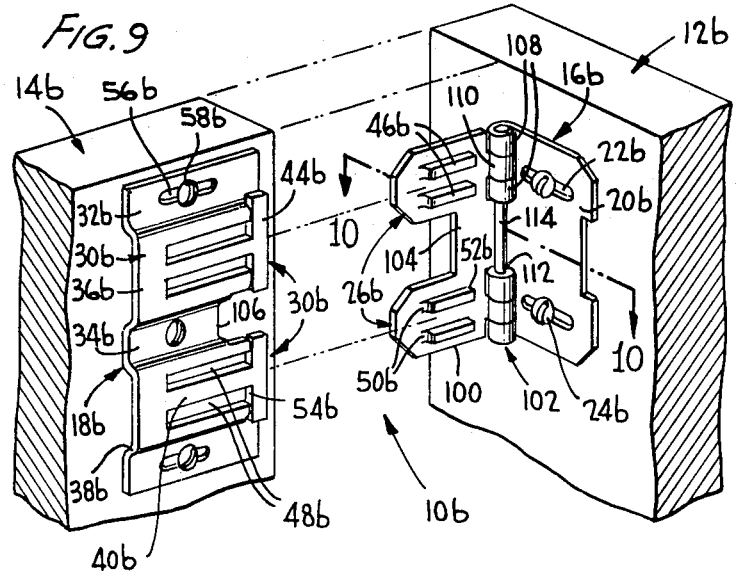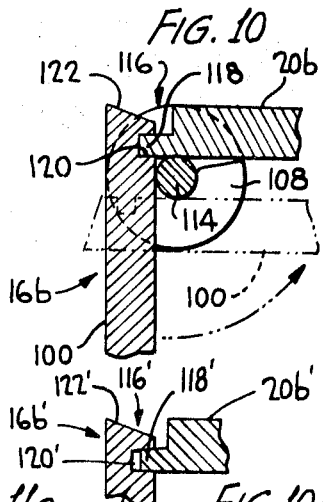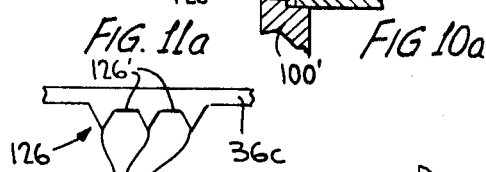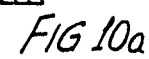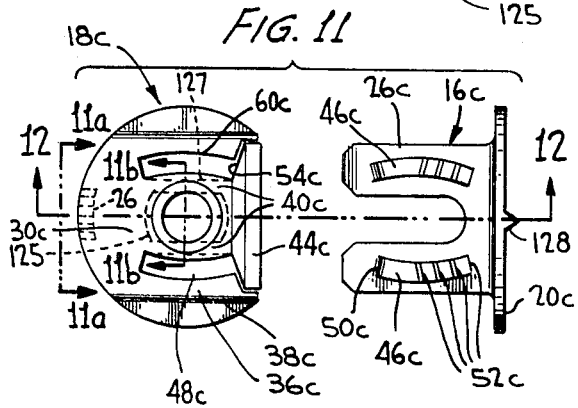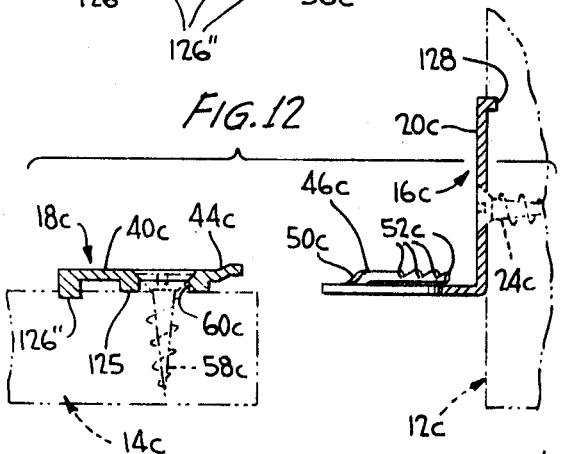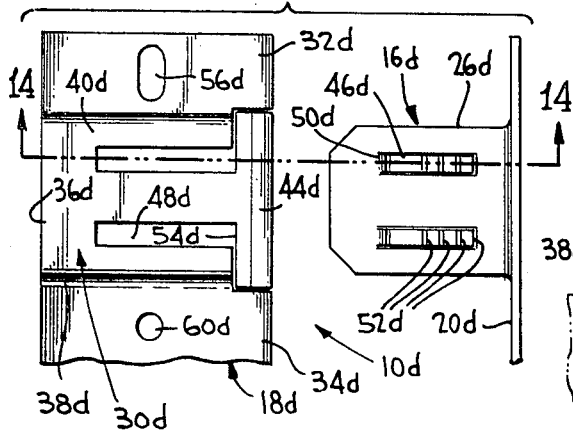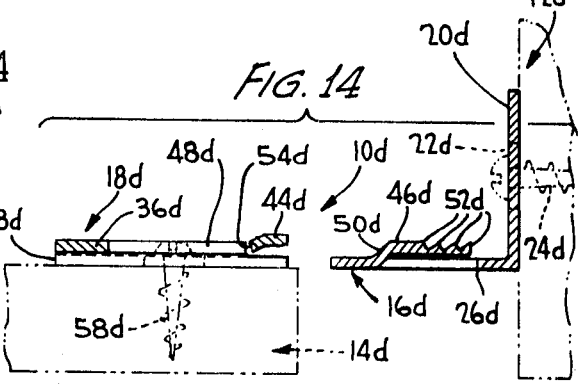

CLIP ASSEMBLY

This application is a continuation-in-part of application Ser. No. 3800 filed Jan. 19, 1970.

This invention is related to a clip assembly and is related more particularly to different forms of a clip set for joining a pair of structural members such as elements forming portions of vanities, cabinets, shelves and the like. Additionally, the clip assembly may be used for joining portions of packing boxes to each other and to pallets used in moving the packing boxes with yoke means being provided to permit ready disassembly of the members joined by the clip assembly without the need for additional tools.

The clip set of the instant invention may have various forms and may be used for diverse applications. For example, in the manufacture of vanities or cabinets such as are commonly used in homes, it is desired that the structural members forming the same be "knocked down" for transportation, but readily assembled on the site. Preferably, such assembly can be accomplished by the end user without the need for any special tools even including such simple tools as screw drivers and the like. The ability to transport or ship such articles as vanities and the like in "knocked down" relationship significantly reduces shipping costs due to the reduction in bulk of the article. Yet, the end user must be capable of assembling the article relatively quickly, since, if assembly were an exceptionally time-consuming project, then the savings in shipping costs would be quickly offset due to the expenses for labor. Therefore, a clip set which is capable of permitting quick assembly of "knocked down" articles such as vanities or the like must be extremely simple to use and, preferably, be capable of use without the need for any tools.

Additionally, such a clip set must be capable of providing extremely secure assembly of the structural members with no likelihood that the structural members will accidentally become disassembled by being jarred or bumped. Yet, it must be possible to readily disassemble the elements if it is again desired to "knock down" the article for movement to a new location.

Clip sets of the type discussed hereinabove may have other application than for use in "knocked down" articles to be assembled on the site. For example, such slip sets may be used to secure various fixtures to walls, such as cabinets, shelves and the like and may also be used in mobile homes or marine use to prevent fixtures from jarring loose from a wall while being transported either on a boat or in a trailer. Additionally, such clip sets may find use in various prefabricated or precut articles such as prefabricated homes or the like as well as in larger articles such as trusses or bridges or the like.

Clip sets of the type with which the instant invention is concerned are also particularly useful in temporarily joining the sides of packing boxes to each other for commercial transportation of various articles. Generally, such packing boxes are supported on pallets which are carried by forklift trucks or the like in a well-known manner. With such an arrangement it is also desirable to be able to temporarily secure the packing boxes to the pallets by the clip assemblies of this invention to preclude accidental sliding of the packing boxes from the pallets during movement.

It is generally desirable, regardless of the use to which the clip sets of this invention are put, to be able to disassemble the joined elements without the need for additional tools. This need causes particular difficulties when a plurality of clip sets are used simultaneously, since it is necessary to maintain all of the clip sets in a released condition at the same time in order to disassemble the joined elements. The ability to selectively "open" one or all of the clip sets and retain them in this condition while disassembly is effected without losing the ability to subsequently "close" the slip sets for further use is the basic object of one of the embodiments of this invention. To this end, according to a preferred arrangement, manually operable yoke means are provided which permit release of the clip means during disassembly without requiring extraneous tools. Thus, once the clip elements are secured to the selected structural members, assembly and disassembly of the structural members may readily be effected over and over again.

It will be readily recognized that clip sets of the type with which the instant application is concerned may have various and sundry uses and may be manufactured of various materials in different sizes and strengths depending upon the particular use to which the clip set is to be put. Yet, regardless of the use, size or material of manufacture, clip sets of the type to which this application is directed have various common functional attributes. Therefore, it is an important object of the instant invention to provide a clip set or assembly which satisfies all of these common important requirements and yet, which by variation of size and material of manufacture, may be utilized in a variety of situations.

In this regard, it is a primary object of the instant invention to provide a clip set including male and female clip elements which may be separately secured to structural members to be later assembled on the site, wherein the assembly procedure and the disassembly procedure do not require the use of any tools.

Further, the instant inventive concepts contemplate the provision of a clip assembly which, once the structural members are secured together thereby, will provide excellent supporting characteristics capable of carrying substantial loads without accidental disassembly while permitting ready disassembly when necessary. In this same vein, the clip assembly of the instant invention is such that the structural members will not separate accidentally and will not accidentally lock when in its released condition, even though the assembly is subjected to unusual shocks in use.

Yet another object of the instant inventive concepts is the provision of an exceptionally compact form of clip assembly for use where space is quite limited which still provides excellent functional properties.

A still further object of the instant invention is the provision of locking means having a plurality of operative positions so that the clip elements will be lockingly engaged with each other even if complete assembly of the clip elements is not effected due to a misalignment of the parts or an irregularity in the structural members to be joined.

Another object of this invention is to provide means to preclude rotation between a clip element and the member to which it is secured when securement is effected by only a single screw or the like.

Yet a further object of this invention is the provision of a collapsible clip element which, in use, is angular so as to permit joining structural members together in other than end-to-end relationship, but which folds on itself to minimize space required in storing and shipping such a clip element prior to use in the clip assembly.

Basically, the primary objects of the instant invention include the provision of a clip assembly which is simple and inexpensive to manufacture, since such assemblies must be capable of production in large numbers at low cost, the provision of a clip assembly which is sturdy and durable in construction since such assemblies must be capable of taking relatively large loads, and the provision of a clip assembly which is highly reliable in use since such assemblies must insure that the structural members joined thereby will not become accidentally separated and that the clip set itself will not accidentally lock when it is desired to disassemble the members joined thereby.

Other and further objects reside in the combination of elements, arrangements of parts and features of construction. Still other objects will in part be obvious and in part be pointed out as the description of the invention proceeds and as shown in the accompanying drawings wherein:

FIG. 1 is an exploded fragmentary perspective view showing portions of a typical male and female clip element of a clip set including a yoke means according to a preferred embodiment of the instant inventive concepts;

FIG. 2 is an exploded view of the clip set of FIGURE 1 showing the manner in which the same is used to secure structural members such as sides of a packing box, to each other;

FIG. 3 is an exploded fragmentary perspective view of a modified form of a clip assembly as would be used for securing a packing box to a shipping pallet;

FIG. 4 is a view similar to FIG. 2 showing the use of the clip assembly of FIG. 3 for securing a packing box to a pallet;

FIG. 5 is an exploded fragmentary plan view of a clip assembly of the type shown in FIGS. 3 and 4;

FIG. 6 is a transverse cross-sectional view through the female clip element of FIG. 5 taken along lines 6—6 and showing the female clip means in its releasing relationship;

FIG. 7 is an exploded plan view of a modified clip assembly according to this invention, particularly useful in limited space applications;

FIG. 8 is a side elevational view of the male clip element of the embodiment of FIG. 7 showing a right-angular version thereof in dotted lines;

FIG. 9 is an exploded perspective view of yet a further embodiment of the instant inventive concepts utilizing a hinged male clip element which may be collapsed when not in use to preserve space;

FIG. 10 is an enlarged fragmentary cross-sectional view taken substantially on lines 10—10 of FIG. 9 showing the portions of the hinged male clip element in solid lines in their operative position and in dotted lines in their collapsed position;

FIG. 10a is a fragmentary cross-sectional view of a slight modification of FIG. 10;

FIG. 11 is an exploded plan view of a modification of the embodiment of FIGS. 7 and 8 which includes a plurality of locking means for joining the structural members when the clip assembly is not fully engaged, and which also includes teeth means to preclude rotation of both the male and female clip elements about a single-securing means;

FIG. 11a is an enlarged and elevational view showing the teeth means on the female clip element and taken substantially along lines 11a—11a of FIG. 11;

FIG. 11b is an enlarged fragmentary transverse cross-sectional view taken substantially along lines 11b—11b of FIG. 11;

FIG. 12 is a transverse cross-sectional view taken substantially along lines 12—12 of FIG. 11 and showing in dotted lines the manner in which the clip elements of this embodiment would be secured to structural elements to be joined thereby;

FIG. 13 is a fragmentary view similar to FIG. 11 showing the use of the adjustable locking means in a modified form of clip assembly according to this invention; and FIG. 14 is a view similar to FIG. 12 taken substantially on lines 14—14 of FIG. 13.

Like reference characters refer to like parts throughout the several views of the drawings.

Referring now to the drawings in general, and more particularly to FIGS. 1–6, the basic clip set or assembly of this invention will be described with subsequent reference in detail to the yoke means which forms a preferred feature of the instant inventive concepts. Further understanding of this basic clip set may be had by reference to U.S. Pat. No. 3,490,797 issued Jan. 20, 1970, the disclosure of which is incorporated herein in its entirety.

Since the embodiment of FIGS. 1 and 2 differs only from the embodiment of FIGS. 3 and 4 by the relationship of the male clip element, FIGS. 1 and 2 showing an outside right-angular element, and FIGS. 3 and 4 showing a flat male element, identical reference characters will be used for both embodiments. The clip set itself is designated generally by the reference numeral 10 and the structural members joined thereby are designated generally by reference numerals 12 and 14. It is to be understood that the structural members 12 and 14 are illustrative of various parts of different articles. For example, the joined members may be two wall portions of a vanity to be shipped in "knocked-down" relationship. Alternatively, one member may be a wall to which a shelf, the other member, is to be attached either in an ordinary home or in a mobile home or on a boat. As shown in FIG. 2, the members 12 and 14 may be sides of a packing crate or as shown in FIG. 4, member 12 may be a side of a packing crate and member 14 may be a portion of a shipping pallet. Other similar uses will be readily apparent to those skilled in the art.

It will be readily understood that while a single clip assembly 10 has been shown in the drawing as illustrative it will be common to use a plurality of spaced clip assemblies to join structural members to each other, the number and spacing of the clip assemblies depending upon the load to be carried and the length of the structural members to be joined.

Each clip assembly 10 comprises basically a male clip element designated generally by the reference numeral 16 and a female clip element designated generally by the reference numeral 18.

The male clip element 16 includes supporting portions 20 for securing the same to one of the structural members, in this instance the member 12. Securement of the male clip element 16 to the structural member 12 may be accomplished in various manners, a preferred construction being a pair of spaced elongated slots 22 defined through the supporting portions 20 for reception of fastening members, in this instance screws 24, smaller in cross section than the length of the slots to allow for adjusting the relationship of the male clip element 16 on the structural member 12 as desired.

The male clip element 16 further includes at least one male clip means integrally connected to the supporting portions 20, and preferably includes a pair of male clip means 26 in the form of elongated tongue means extending from, and integrally secured to, the supporting portions 20 to form a generally U-shaped male clip element with the male clip means 26 being in the form of leg elements having bevelled leading ends 26' and trailing ends 26" joined by a connecting portion which in this instance corresponds to the supporting portions 20. In the embodiment of FIGS. 1 and 2, the male clip means 26 each extend in a plane generally normal to the plane of the supporting portions 20 of the male clip element 16 to provide for right-angular joining of the structural members 12 and 14 in a manner to be described in more detail hereinafter. In the embodiment of FIGS. 3 and 4, the male clip element 16 is substantially identical to the male clip element 16 of the embodiment of FIGS. 1 and 2, with the exception that the male clip means 26 each extend in generally the same plane as the supporting portions 20 to permit joining of the packing box 12 to the side of the pallet 14.

While clip assemblies have been shown in the drawing for end-to-end and right-angular joining of structural members, it will be readily recognized that such showings are illustrative and any angular relationship between the structural members may be provided by angularly disposing the male clip means with respect to the supporting portions therefor at the proper relationship.

The female clip element 18 also includes supporting portions and at least one female clip means 30 integrally secured thereto. In the embodiment of the drawing, two such female clip means 30 are shown to cooperate with the two male clip means 26 on the male clip element 16. Thus, in the embodiment shown in the drawing, the supporting portions of the female clip element 18 include end supporting portions 32 and a central supporting portion 34 with one female clip means 30 being defined between each end supporting portion 32 and the central supporting portion 34.

Each female clip means 30 comprises a pocket dimensioned to receive the tongue means of the male clip means therein in a manner to be described in more detail hereinafter. The pocket is formed from offset portions 36 parallel to the supporting portions 32, 34 and integrally connected thereto by bent portions 38.

Spring finger means 40 are defined in the offset portions 36 of each female clip means 30 with the spring finger means being resiliently secured to the offset portions 36 at one end 52 and having a freely extending opposite end portion 44. The spring finger means 40 are adapted to overlie the tongue means of the male clip means 26 in the assembled relationship of the male and female clip elements 16, 18 in a manner described in more detail hereinafter to form part of the aforementioned pocket for the tongue means.

Cooperating locking means are defined on the male and female clip means. The locking means includes a pair of elongated protuberances 46 defined on the tongue means of each male clip means 26 and a pair of corresponding elongated channels 48 defined on opposite sides of each spring finger means 40.

The protuberances 46 are preferably pressed directly from the material of the tongue means and, as will be seen from the drawing, extend generally longitudinally of the tongue means in laterally spaced relationship. The leading ends of the protuberances each having camming portions 50 and the trailing ends of the protuberances each have what may be referred to as "planar locking edge portions" 52.

The spring finger means 40 are generally T-shaped with end portions 44 terminating in a crossbar. The channels 48 are defined on opposite sides of the staff of the "T" in the offset portions 36 of each female clip means 30 with portions of the crossbar of the "T" extending transversely across one end of each channel 48 and including what may be referred to as "cooperating planar locking edge portions" 54.

As will be described in more detail hereinafter, the cooperating planar locking edge portions 54 at the ends of the channels 48 engage against or lock with the planar locking edge portions 52 at the trailing ends of the protuberances 46 in the assembled relationship of the male and female clip elements 16, 18 to preclude accidental disassembly of the clip set and thereby of the structural members 12,14.

The female clip element 18 is preferably secured to its structural member, in this instance, the structural member 14, by a pair of elongated slots 56 defined in the end supporting portions 32, these slots being adapted to receive therethrough fastening means such as screws 58 smaller in cross section than the length of the slots, with the central supporting portion 34 of the female clip element 18 having an aperture 60 defined therethrough of the general cross section of the fastening means such as a screw (not shown) that is to be secured therethrough. In this manner, some adjustability of the positioning of the female clip element 18 on the structural member 14 may be accomplished after the screws have been secured through the supporting portions of the female clip element 18 and into the structural member 14.

The use and operation of the clip assembly 10 to join structural members 12, 14 to each other will now be readily understood. The male clip element 16 is secured to the structural member 12 by the screws 24 through the slots 22 of the supporting portions 20. Adjustability of the positioning of the male clip element 16 on the structural member 14 may be accomplished by the use of elongated slots such as shown at 22 if desired.

The female clip element 18 is secured to the structural member 14 by screws 58 passed through slots 56 in the end supporting portions 32 and the aperture 60 in the central supporting portion 34 of the female clip element 18, respectively.

The various elements are dimensioned so that, in the assembled relationship when the tongue means of the male clip means 26 has been inserted into the pocket defined by the female clip means 30, the aforementioned locking means are superimposed, that is, the cooperating planar locking edge portions 54 on the crossbar of the spring finger means 40 of the female clip means 30 seat against the planar locking edge portions 52 on the trailing ends of the protuberances 46 on the tongue means of the male clip means 26 to preclude withdrawal of the male clip means 26 from the female clip means 30 and to securely join the structural members 12 and 14. The camming portions 50 of the protuberances 46 assist in lifting the spring finger means 40 during the assembly procedure while the resilient connections at 42 cause the spring finger means 40 to return to their normal position and lock the protuberances 46 within the channels 48.

From the above explanation it will be seen that, once the male and female clip elements 16, 18 have been secured to the structural members 12, 14 respectively, the structural members may be subsequently joined without the need for any further tools by merely engaging the male and female clip means 26,30 respectively. Thus, for example, if a vanity is shipped in "knocked down" relationship, it may be readily assembled on the site with no tools being necessary. Yet, the securement of the structural members is such that accidental disassembly between the structural members will not occur even if the structural members are subjected to some sudden shock or jarring action.

In order to permit disassembly of the clip set 10 to enable separation of the structural members 12, 14 when desired, the instant invention provides a manually operable yoke means designated generally by the reference numerals 75 on the female clip element 18. The yoke means 75 includes yoke member 76 which is rotatably secured by hinge means designed generally by the reference numeral 78 to portions of the spring finger means 40 spaced from the resiliently secured end portions 42 thereof. Cam means designated generally by the reference numerals 80 are provided on the yoke member 76 at the terminal end portions thereof and slidingly engage with a fixed surface, preferably the side supporting portions 32 of the female clip element 18, for movement between a first position shown in FIG. 6 wherein the free end portions 44 of the spring finger means 40 are moved to a releasing relationship, that is, the spring finger means 40 are raised, and a second position shown in FIGS. 1–5, wherein the free end portions 44 of the spring finger means 40 resiliently return to the locking relationship described hereinabove.

The yoke member 76 is rotated about the hinge means 78 by an actuating means in the form of a U-shaped connecting portion 82 which extends over the depressed central supporting portion 34 of the female clip element 18.

The hinge means 78 preferably include strap means 84 pressed from the spring finger means 40 and defining a hinge opening 86 through which hinge portions 88 of the yoke member 76 extend. The hinge portions 88 of the yoke member 76 include a generally flat upper surface elongated in a direction parallel to the longitudinal extent of the strap means 84 as will be seen in the drawing.

The strap means 84 are preferably initially pressed from the spring finger means 40 of the female clip element 18 and the yoke member 76, which is formed of a resilient material, is compressed so that the terminal end portions 80 thereof are positioned intermediate the hinge openings 86. The yoke member is then permitted to spring back to the shape shown, for example, in FIG. 5, with the hinge portions 88 extending through the hinge openings 86. The yoke member is then pulled back to the portion of the hinge opening 86 remote from the free end portions 44 of the spring finger means 40, and the yoke is lifted, preferably to within 10° of vertical, as shown in FIG. 6 and the leading edges of the strap means 84 are pressed down even with the surface of the spring finger means as shown in FIG. 6, to thereby create a stop means 90, which limits the rotation of the yoke member 76. The metal is then hardened in the usual manner.

Preferably, recess means 92 are provided in the side supporting portions 32 of the female clip element 18 to engage the terminal end portions 80 of the yoke member 76 in the releasing relationship shown in FIG. 6.

The use and operation of the yoke means 75 will now be readily understood. When it is desired to disassemble the structural members 12, 14, the spring finger means 40 can be raised to the releasing relationship shown in FIG. 6 by manually grasping the actuating means 82 and rotating the yoke member 76 about the hinge means 78 so that the cam means or terminal end portions 80 of the yoke member 76 slide along the side supporting portions 32 of the female clip means 18 until the hinge portions 88 of the yoke member 76 engage the stop means 90 and the terminal end portions 80 of the yoke element 76 engage the recess means 92. This will retain the female clip means in the releasing relationship shown in FIG. 6 until the male and female clip means are disengaged. Obviously, when a plurality of clip assemblies 10 are utilized, any selected group or all of the clip assemblies can be moved to their releasing relationship and will stay in that relationship until the actuating means 82 is pressed downwardly to release the terminal end portions 80 of the yoke member 76 from the recess means 92 and permit the spring finger means 40 to return to their locking relationship.

Although the yoke means has only been shown in association with a clip assembly having double male and female clip means, it will be obvious that by simple modification thereof, a similar construction can be provided for a clip assembly having only a single-male and female clip means or a multiplicity of male and female clip means.

An embodiment of the instant inventive concepts utilizing only a single-male and female clip means will be seen in FIGS. 7 and 8. This particular embodiment is specifically designed for use in areas where limited space is available, since it is especially compact, although, obviously, it can be used for any application to join structural members to each other. The basic clip assembly shown in FIGS. 7 and 8 is quite similar to the basic clip assembly of the other embodiments described hereinabove, like parts have been designated by the same reference numeral followed by the suffix "a." While a yoke assembly has not been shown in association with the embodiment of FIGS. 7 and 8, one can obviously be utilized therewith, although for most applications wherein this compact clip assembly 10a would be used, the yoke assembly may not be necessary.

The basic distinction between the clip assembly 10a shown in FIGS. 7 and 8 and the clip assembly shown in the aforementioned U.S. Pat. No. 3,490,797 and in FIGS. 1–6 of this application resides in the means for securing the same to the structural members to be joined. Thus, in the clip assembly 10a the supporting portions 20a of the male clip element 16a are round and include a single aperture 22a for reception of a conventional securing means such as a screw or the like, (not shown). A single aperture 60a is defined in the spring finger means 40a of the female clip element 18a, this forming part of the overall supporting portions of the female clip element. In order to accommodate the screw (not shown) engaged in the aperture 60a, the tongue means 26a of the male dip element 16a has its central portion cut away to permit the remainder of the tongue means to slide on opposite sides of the screw secured through the aperture 60a. The protuberances 46a and the channels 48a on the male and female clip elements, respectively, may be arcuate as shown in FIGS. 7 and 8.

Of course, the male clip element 16a may be substantially flat for end-to-end joining or may be bent perpendicularly as shown in dotted lines in FIGS. 7 and 8 for right-angular joining.

The securing means (not shown) engaged through the apertures 60a in the female clip element 18a may be either loosely secured or may have a shank portion which limits the depth of securement to a structural member in order that the spring finger means 40a can be raised sufficiently for engagement of the protuberances 46a in the channel means 48a. Further, a spacer means may be used to insure that the spring finger means is not tightened too much as will be explained in more detail hereinafter with reference to the embodiment of FIGS. 11 and 12.

Reference is now made particularly to FIGS. 9 and 10 wherein a further modified clip assembly according to the instant inventive concepts is shown, parts similar to parts in embodiments described hereinabove being designated by the same reference numeral followed by the suffix "b." Although this embodiment has been shown without the yoke means of FIGS. 1–6, it is obvious that the yoke means thereof would be equally useful with this embodiment. Except for the absence of the yoke means, the embodiment of FIGS. 9 and 10 differs basically from the embodiment of FIGS. 1–6 in the provision of a hinged male clip element 16b. The male clip element 16b includes supporting portions 20b pivotably connected to further portion 100 by hinge means 102. The embodiment shown in FIG. 9 includes a pair of male clip means 26b for engagement with a cooperating pair of female clip means 30b, although the collapsible feature of this embodiment could also be utilized with a clip set having a single-male and female clip means. However, when a pair of male clip means 26b are to be utilized, the further portions 100 are generally U-shaped including spaced leg portions each of which carries a male clip means 26b with connecting portions 104 extending between the trailing ends of the leg portions as will be seen particularly in FIG. 9. Portions of the female clip element 18b are cut away as shown at 106 to accommodate the connecting portions 104 of the male clip element 16b.

The hinge means 102 include cooperating cylindrical portions 108, 110 of the male and female clip elements 16b, 18b, respectively, which together define aligned, spaced, hinge openings 112 adjacent the trailing ends of each of the leg portions. Hinge pin means extend through the hinge openings and preferably take the form of a single-hinge pin member 114, the opposite ends of which are rotatably received in each of the hinge openings 112. Any conventional means may be utilized to preclude accidental displacement of the hinge pin member 114 from the hinge openings 112.

As will be seen particularly in FIG. 10, locking means designated generally by the reference numeral 116 are provided to secure the supporting portions 20b and the further portions 100 of the male clip element 16b in their operative or angular position and to preclude accidental or undesirable collapsing of the male clip element 16b when in use. The locking means 116 include a tongue means 118 carried by one of the portions of the male clip element 16b, in this instance, by the supporting portions 20b which is adapted to engage in a groove means 120 defined in the other portion. An angular camming surface 122 is also provided in the portions 100 adjacent the groove means 120, this portion of the male clip element 16b being formed of a resilient material such as spring steel. Thus, when the portions 100 are moved from the collapsed position shown in dotted lines in FIG. 10 to the operative position shown in full-lines in FIG. 10, the tongue means 118 engages against the camming surface 122 to urge the resilient metal away from the tongue means permitting the same to ride over the tongue means until the tongue means and groove means are aligned and the resilient metal causes locking of the supporting portions 20b and the further portions 100.

In this manner, the male clip element may be collapsed for compactness during storage and shipping and locked in its angular relationship when it is to be used to secure the structural members 12b and 14b to each other. Of course, although a right-angular relationship has been shown in FIGS. 9 and 10, it is obvious that collapsible male clip elements may be provided for other angular relationships in similar manner.

In FIG. 10a a slight modification of the embodiment of FIGS. 9 and 10 is shown wherein like parts are designated by the same reference characters followed by a prime. A portion of the tongue 118' and groove 120' has been shown as slightly deeper than the tongue 118' (the showing being exaggerated for illustrative clarity). The bevel provides constant pressure against the tongue 118' to retain the same within the groove 120'. The elongated groove 120' is merely shown to provide manufacturing tolerances. Of course, the lower surfaces of the tongue and groove may be similarly bevelled if desired.

Reference is now made to FIGS. 11, 11a, 11b and 12 for yet another embodiment of clip set according to this invention, which is similar to the embodiment of FIGS. 7 and 8, but includes several additional features. Parts of the embodiment of FIGS. 11 and 12 similar to parts of other embodiments of this invention have been designated by the same reference numerals followed by the suffix "c." One of the features of the embodiment of FIGS. 11 and 12 is the incorporation of spacer means 125, referred to hereinabove with reference to the embodiment of FIGS. 7 and 8. The spacer means 125 preferably takes the form of a boss disposed adjacent at least a portion of the aperture means 60c on the undersurface of the spring finger means 40c, the depth of the boss 125 being substantially equal to the thickness of the material forming the male clip element 16c.

Proper spacing of the female clip means 30c from the structural member 14c can also be assisted by use of the teeth means 126 seen particularly in FIG. 11a. It is to be noted that the base portions 126' of the teeth means 126 are solid, so as to provide a spacing from the structural member 14c. The teeth means 126 provide the further function of precluding rotation of the female clip means 18c about the single-securing means 58c engaged through the aperture means 60c by the crest portions 126" of the teeth means 126 actually penetrating the structural member 14c as will be seen particularly in FIG. 12.

Similarly, rotation of the male clip element 16c about a single-securing means 24c may be precluded by provision of an additional teeth means 128 on the supporting portions 20c of the male clip element 16c, in this instance, a single tooth which functions to penetrate the structural member 12c during assembly.

Yet another very important feature of the embodiment of FIGS. 11 and 12 is the use of a plurality of locking edge portions 52c spaced along the length of each protuberance 46c of the male clip element 16c. These plurality of locking edge portions 52c are shaped as a ratchet and permit locking engagement between the male and female clip elements 16c, 18c, respectively, even when the male clip means 26c is not fully inserted into the pocket formed by the female clip means 30c. Such a situation can occur when the individual clip elements are improperly positioned on the structural members or when an irregularity exists either in the clip elements or in the structural members. With an arrangement such as shown in the previous embodiments, locking engagement will not result unless and until the male clip means and the female clip means are fully superimposed so that the complete protuberances can fit within the channels. With the embodiment of FIGS. 11 and 12, locking engagement will occur even if only a portion of the protuberances 46c are received within the channels 48c, so long as at least the foremost locking edge portions 52c of the protuberances 46c are received behind the cooperating locking edge portions 54c of the crossbar of the spring finger means 40c.

In order to permit engagement of any of the locking edge portions 52c with the cooperating locking edge portions 54c without hindrance resulting from the crossbar of the spring finger means 40c, end portions 44c of the spring finger means 40c are bent upwardly immediately in front of the cooperating locking edge portions 54c as will be seen particularly in FIG. 12, to accommodate any remaining portions of the protuberances 46c not received within the channels 48c.

Due to the arcuate nature of the protuberances 46c, a reverse bevel 127, seen particularly in FIG. 11b may be provided adjacent each channel means 48c to permit passage of the leading ends 50c of the protuberances 46c without hindrance during assembly of the male and female clip means.

Further, although the locking edge portions 52c and the cooperating locking edge portions 54c have been shown as disposed at a slight angle in FIG. 11, these means may be disposed perpendicularly to the longitudinal extent of the tongue means 26c and the spring finger means 40c, respectively, if desired, as shown in the embodiment of FIGS. 13 and 14, now to be described.

In FIGS. 13 and 14, the use of a plurality of locking edge portions is illustratively shown with a clip assembly of the type disclosed in aforementioned U.S. Pat. No. 3,490,797. Except for the plurality of locking edge portions and the absence of the yoke means, the embodiment of FIGS. 13 and 14 is substantially identical to the embodiment of FIGS. 1–6 and similar parts have, therefore, been designated by the same reference numeral followed by the suffix "d." The use and operation of this embodiment is believed to be obvious from the explanation hereinabove with reference to the embodiment of FIGS. 11 and 12. In this embodiment, since the plurality of locking edge portions provide for longitudinal adjustment, the slots 56d may be elongated in a direction transverse to that shown in FIG. 9 to provide transverse adjustability. The central aperture 60d is used to affix a securing means after the female clip element 18d and has been finally positioned to preclude further movement of this element. Of course, the slots (not shown) in the male clip element 16d may also be transverse to the direction shown for the slots 22b in FIG. 9 and an additional aperture in the male supporting portions may be provided to finally secure the male clip element 16d after it is adjustably positioned.

It will now be seen that there are herein provided improved clip assemblies which satisfy all of the objectives of the instant invention, and other, including many advantages of great practical importance and commercial utility. Many of the features shown in specific embodiments herein may be utilized either alone or in combination with other features shown in other embodiments.

What is claimed is:

1. In a clip assembly for joining a pair of structural members, the clip assembly including a male clip element and a female clip element, the male clip element including supporting portions adapted to be secured to one of the structural members and at least one male clip means including at least one tongue means having protuberance means thereon, the female clip element including supporting portions adapted to be secured to the other of the structural elements and at least one female clip means including a pocket means defined by a spring finger means which at least partially overlies the tongue means of the male clip means in the assembled relationship of the male and female clip elements, the spring finger means also at least partially defining channel means adapted to at least partially receive the protuberance means of the male clip means in the assembled relationship of the male and female clip elements, and cooperating locking means on the male and female clip means adapted to lockingly engage at least part of the protuberance means in the channel means in the assembled relationship of the male and female clip elements, the spring finger means being resiliently secured at one end portion and having free end portions which are movable between a locking relationship wherein the cooperating locking means are operatively engaged when the male and female clip elements are assembled to secure the male and female clip elements to each other, and a releasing relationship wherein the cooperating locking means are disengaged to permit separation of the male and female clip elements, the improvement which comprises:

a yoke means carried by said female clip element, said yoke means including a yoke member;

hinge means rotatably securing a portion of said yoke member to said spring finger means in spaced relationship to said resiliently secured one end portion of said spring finger means;

cam means on said yoke member in spaced relationship to said hinge means and slidingly engageable with a fixed surface for movement between a first position wherein said free end portions of said spring finger means are moved to said releasing relationship and a second position wherein said free end portions of said spring finger means resiliently return to said locking relationship; and actuating means on said yoke member which permits manual rotation of said yoke member about said hinge means to selectively slide said cam means between said first and second positions.

2. The improvement of claim 1 wherein said hinge means includes strap means carried by said spring finger means and defining a hinge opening, hinge portions of said yoke member extending through said hinge opening and being rotatably secured in said hinge opening by said strap means.

3. The improvement of claim 2 wherein said hinge portions of said yoke member include a generally flat upper surface elongated in a direction parallel to the longitudinal extent of said strap means, said strap means being bent to provide a stop means engaged by said upper surface of said hinge portions of said yoke member when said yoke member has been rotated about said hinge means by a predetermined amount, said stop means limiting movement of said yoke means to a relationship wherein said cam means is in said first position.

4. The improvement of claim 2 wherein said cam means includes cam portions of said yoke member extending generally perpendicularly to, and spaced from, said hinge portions thereof, said cam portions being defined by terminal end portions of said yoke member.

5. The improvement of claim 4 wherein said male clip element includes a pair of spaced male clip means and said female clip element includes a corresponding pair of female clip means, said yoke means including hinge means rotatably securing portions of a single-yoke member to the spring finger means on each of said female clip means, said yoke member including cam means at each of its terminal end portions and spaced from each of said hinge means, and said actuating means being defined on said yoke member intermediate said hinge means 6. The improvement of claim 5 wherein said female clip element includes a pair of laterally spaced female clip means, said supporting portions of said female clip element including central-supporting portions extending laterally between said female clip means and side supporting portions extending laterally on each side of said female clip means, each of said female clip means being offset from said central and side supporting portions to define said pockets for reception of at least part of said tongue means of said male clip element, said hinge means including strap means carried by each of said spring finger means and defining hinge openings having aligned axes extending generally transversely of the longitudinal extent of said spring finger means, laterally spaced hinge portions of said yoke member extending through said hinge openings and being rotatably secured in said hinge openings by said strap means, said cam means including terminal end portions of said yoke member on opposite sides of said hinge means extending generally perpendicularly to, and spaced from, each of said hinge portions of said yoke member, said terminal end portions of said yoke member overlying said side supporting portions of said female clip element and engageable therewith to perform their camming function on rotation of said yoke member about said hinge means, and said actuating means including generally U-shaped portions of said yoke member connecting said hinge portions thereof and overlying said central supporting portions of said female clip element, said U-shaped member having leg portions extending generally perpendicularly to said hinge portions of said yoke member in a direction generally opposite to the direction in which said cam means extends with respect to said hinge portions of said yoke member.

7. The improvement of claim 6 wherein said hinge portions of said yoke member include a generally flat upper surface elongated in a direction parallel to the longitudinal extent of said strap means, said strap means being bent to provide a stop means engaged by said upper surface of said hinge portions of said yoke member when said yoke member has been rotated about said hinge means by a predetermined amount, said stop means limiting movement of said yoke means to a relationship wherein said cam means is in said first position.

8. The improvement of claim 7 further including detent means defined in each of said side supporting portions of said female clip element, said terminal end portions of said yoke member engaging in said detent means when said yoke member has been rotated about said hinge means to a relationship wherein said cam means are in said first position.

9. The improvement of claim 1 wherein said protuberance means includes a pair of elongated protuberances defined on said tongue means, said protuberances each having leading and trailing ends with the protuberances extending generally longitudinally of said tongue means and being transversely spaced from each other on said tongue means, said channel means including a pair of elongated channels defined on opposite sides of said spring finger means, said cooperating locking means including means defining locking edge portions on said male clip means extending generally transversely of each of said protuberances in spaced relationship to said leading ends thereof and portions of said spring finger means extending generally transversely across one end of each of said channels to define cooperating locking edge portions on said female clip means.

10. The improvement of claim 9 wherein said means defining locking edge portions on said male clip means define a plurality of locking edge portions extending generally transversely of each of said protuberances, said plurality of locking edge portions on each of said protuberances each being spaced from said leading ends of said protuberances and being spaced from each other along the length of each of said protuberances, whereby said cooperating locking means will be operatively engaged even if said tongue means is only partially inserted into said pocket means in the assembled relationship of said male and female clip means.

11. In a clip assembly for joining a pair of structural members, wherein the clip assembly includes a male clip element and a female clip element, the male clip element including supporting portions adapted to be secured to one of the structural members and portions defining at least one male clip means, the female clip element including supporting portions adapted to be secured to the other of the structural members and portions defining at least one female clip means, the male clip means comprising portions defining an elongated tongue means having leading and trailing ends, the female clip means comprising portions defining a pocket means dimensioned to at least partially receive the tongue means therein, the pocket means being partially defined by a spring finger means having one resiliently secured end portion and spaced free end portions overlying portions of the tongue means when the tongue means is at least partially inserted into the pocket means in the female clip means in the assembled relationship of the male and female clip elements, and cooperating locking means defined on the male and female clip means, the locking means including a pair of elongated protuberances defined on the tongue means of the male clip means, the protuberances each having leading and trailing ends with the protuberances extending generally longitudinally of the tongue means and being transversely spaced from each other on the tongue means, and means defining a pair of corresponding elongated channels on opposite sides of the spring finger means of the female clip means, the protuberances each including means defining securing means to secure said female clip element to the other of the structural members, the central portion of said tongue means between said leg portions being cut away to permit said leg portions to slide on opposite sides of a securing means engaged with the other of the structural members through said aperture means on said spring finger means.

12. The improvement of claim 11, wherein said protuberances and said channels are each arcuate.

13. The improvement of claim 11 wherein said means defining locking edge portions on said protuberances define a plurality of locking edge portions extending generally transversely of each of said protuberances, said plurality of locking edge portions on each of said protuberances each being spaced from said leading ends of said protuberances and being spaced from each other along the length of each of said protuberances, whereby said cooperating locking means will be operatively engaged even if said tongue means is only partially inserted into said pocket means in the assembled relationship of said male and female clip means.

14. The improvement of claim 11 wherein said female clip element includes a pair of side supporting portions adapted to rest on the structural member to which said female clip element is to be secured and a central offset portion, part of which defines locking edge portions and the channels each including means defining cooperating locking edge portions, the male and female clip means being dimensioned to at least partially superimpose the channels and the protuberances when the tongue means is at least partially inserted into the pocket means in the female clip means in the assembled relationship of the male and female clip elements with the means defining the cooperating locking edge portions of the channels engaging against the means defining the locking edge portions of the protuberances to prevent accidental withdrawal of the tongue means from the pocket means thereby locking the male and female clip elements against accidental disassembly, the spring finger means being generally T-shaped with the free end portions including a crossbar, portions of the crossbar extending transversely across one end of each of the channels and including generally planar edge portions defining the cooperating locking edge portions of the channels, portions of each protuberance spaced from the leading ends thereof including generally planar edge portions extending transversely of the tongue means and defining the locking edge portions of said protuberances, the improvement which comprises said tongue means of said male clip means being generally U-shaped and having spaced leg portions each carrying one of said protuberances, said supporting portions of said female clip element including portions of said spring finger means defining aperture means intermediate said channel means adapted to receive said spring finger means, said female clip element further including spacer means beneath said spring finger means and juxtaposed to said aperture means in said spring finger means, said spacer means being adapted to space said spring finger means from the structural member to which said female clip element is to be secured a sufficient distance to insure that said tongue means of said male clip means can be at least partially received by said pocket means of said female clip means and to preclude a securing means engaged with a structural member through said aperture means on said spring finger means from moving said spring finger means so close to the structural member as to preclude at least partial reception of said tongue means in said pocket means.

15. The improvement of claim 14 wherein said spacer means comprises a boss at least partially surrounding said aperture means on the side of said spring finger means disposed toward the structural member to which said female clip element is to be secured.

16. The improvement of claim 11 wherein said female clip element includes a pair of side supporting portions adapted to rest on the structural member to which said female clip element is to be secured and a central offset portion, part of which defines said spring finger means, said aperture means on said spring finger means being a single aperture for reception of a single-securing means to be engaged with the structural member to which said female clip element is to be secured, said female clip element further including teeth means carried by the side of said offset portion disposed toward the structural member to which said female clip element is to be secured, said teeth means being spaced from the part of said offset portion which defines said spring finger means and being of a depth greater than the distance which said offset portion is offset from said side supporting portions, whereby said teeth means will penetrate the structural member to which said female clip element is to be secured to preclude rotation of said female clip element about a securing means to be engaged with the structural member through said aperture means on said spring finger means.

17. The improvement of claim 11 wherein said supporting portions of said male clip element includes a single aperture for reception of a single-securing means to be engaged with the structural member to which said male clip element is to be secured, said male clip element further including teeth means carried by the side of said supporting portions to be disposed toward the structural member to which said male clip element is to be secured, in spaced relationship to said single aperture, said teeth means being adapted to penetrate the structural member to which said male clip element is to be secured to preclude rotation of said male clip element about the single-securing means to be engaged with the structural member through said single aperture.

18. In a male clip element for use with a clip assembly adapted to join a pair of structural members in an angular relationship wherein the clip assembly includes a male clip element and a female clip element, the male clip element comprising supporting portions adapted to be secured to one of the structural members and further portions including at least one male clip means extendable at the aforesaid angular relationship to the supporting portions to operatively engage a female clip means forming part of the female clip element, the improvement which comprises hinge means pivotally interconnecting said supporting portions and said further portions of said male clip element, said further portions being movable about said hinge means between a collapsed position wherein said further portions extend substantially parallel to, and overly, said supporting portions for compactness in shipping of said male clip element, and an operative position wherein said male clip means extends at said angular relationship to said supporting portions for operative engagement with a female clip means in the assembled relationship of the clip assembly, and releasable locking means at the juncture of said further portions and said supporting portions for selectively locking said further portions to said supporting portions to secure said male clip means in said angular relationship relative to said supporting portions, said locking means including a tongue means defined by one of said portions of said male clip element and a groove means defined by said other of said portions, said tongue means lockingly engaging in said groove means when said male clip means is in said operative position.

19. The improvement of claim 18 wherein said angular relationship is 90°.

20. The improvement of claim 18 wherein said other of said portions is resilient, an angular camming surface being defined on said other of said portions in spaced parallel relationship to said groove means, said tongue means engaging said camming surface during movement of said male clip means from said collapsed position to said operative position to resiliently urge said other of said portions away from said tongue means sufficiently to permit said tongue means to align with said groove means, and the resilience of said other of said portions causing said groove means to engage over said tongue means when said groove means and said tongue means are aligned thereby locking said male clip means in said angular relationship.

21. The improvement of claim 20 wherein said further portions of said male clip element are generally U-shaped and include a pair of spaced leg portions each including a leading end and a trailing end and each defining a male clip means intermediate said ends for operatively engaging a corresponding pair of female clip means on the female clip element in the assembled relationship of the clip assembly, and connecting portions extending between said trailing ends of said leg portions, said hinge means pivotally interconnecting said connecting portions to said supporting portions of said male clip element.

22. The improvement of claim 21 wherein said hinge means includes portions of said supporting portions and said connecting portions together defining a pair of transversely spaced, aligned hinge openings, said hinge openings being defined adjacent said trailing ends of each of said leg portions, hinge pin means extending through said hinge openings, and said locking means being defined by the portions of said supporting portions and said connecting portions between said portions defining said hinge openings.

23. The improvement of claim 20, wherein said groove means is deeper than the portions of said tongue means to be engaged therein, and said tongue and groove means have cooperating bevelled portions to assist in retaining said tongue means in said groove means.

24. In a clip assembly for joining a pair of structural members, the clip assembly including a male clip element and a female clip element, the male clip element including supporting portions adapted to be secured to one of the structural members and at least one male clip means including at least one tongue means having protuberance means with leading and trailing ends thereon, the female clip element including supporting portions adapted to be secured to the other of the structural elements and at least one female clip means including a pocket means defined by a spring finger means which at least partially overlies the tongue means of the male clip means in the assembled relationship of the male and female clip elements, the spring finger means also at least partially defining channel means adapted to at least partially receive the protuberance means of the male clip means in the assembled relationship of the male and female clip elements, and cooperating locking means on the male and female clip means adapted to lockingly engage at least part of the protuberance means in the channel means in the assembled relationship of the male and female clip elements, said cooperating locking means including means defining locking edge portions on said male clip means extending generally transversely of said protuberance means in spaced relationship to said leading end thereof and portions of said spring finger means extending generally transversely across one end of said channel means to define cooperating locking edge portions on said female clip means, the improvement which comprises said means defining said locking edge portions on said male clip means defining a plurality of locking edge portions extending generally transversely of said protuberance means, said plurality of locking edge portions on said protuberance means each being spaced from said leading end of said protuberance means and being spaced from each other along the length of said protuberance means, whereby said cooperating locking means will be operatively engaged even if said tongue means is only partially inserted into said pocket means in the assembled relationship of said male and female clip means.

25. The improvement of claim 24 wherein said protuberance means includes a pair of elongated protuberances defined on said tongue means in transversely spaced relationship, and said channel means includes a channel defined on each side of said spring finger means, portions of said spring finger means extending generally transversely across one end of each of said channels to define said cooperating locking edge portions on said female clip means, and each of said protuberances including said plurality of locking edge portions spaced from its leading end and spaced from each other along the length of said protuberance.